United States Patent [19]
Snizek

[11] 4,093,300
[45] June 6, 1978

[54] AIR DEFLECTOR

[76] Inventor: Heinz Werner Snizek, 45 Grenoble Drive, Apt. 2205, Don Mills, Ontario, Canada

[21] Appl. No.: 697,811

[22] Filed: Jun. 21, 1976

[51] Int. Cl.² ............................................. B62D 37/00
[52] U.S. Cl. ...................................... 296/1 S; 296/91
[58] Field of Search .................................. 296/1 S, 91

[56] References Cited

U.S. PATENT DOCUMENTS 3,596,974  8/1971  Adams ................................. 296/1 S

FOREIGN PATENT DOCUMENTS 2,154,707  5/1973  Germany ............................. 296/1 S Primary Examiner—Philip Goodman

[57] ABSTRACT

An air deflector for a road vehicle is described. The deflector defines a streamlined face which reflects air impinging on said face, upwardly and rearwardly to an upright spoiler region which imparts an upward motion to the air as it leaves the deflector.

9 Claims, 24 Drawing Figures

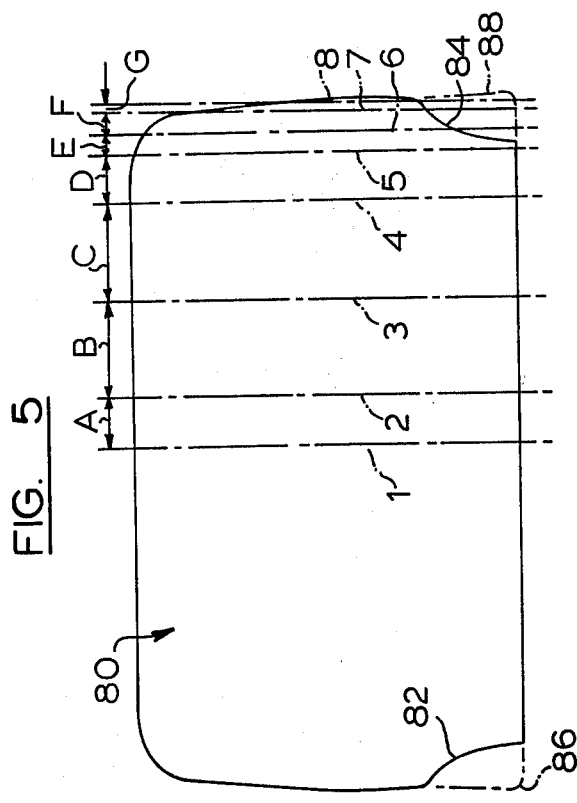
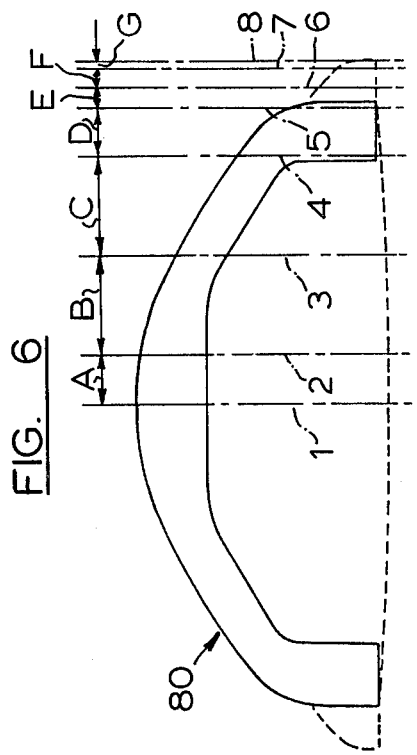
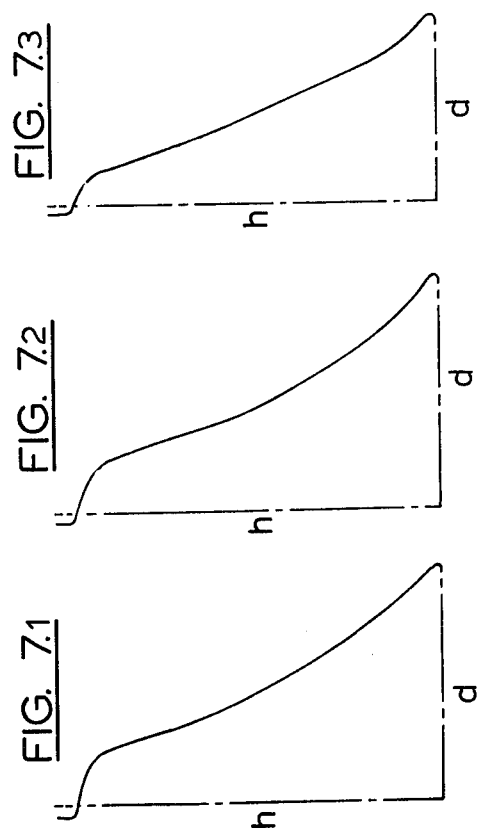
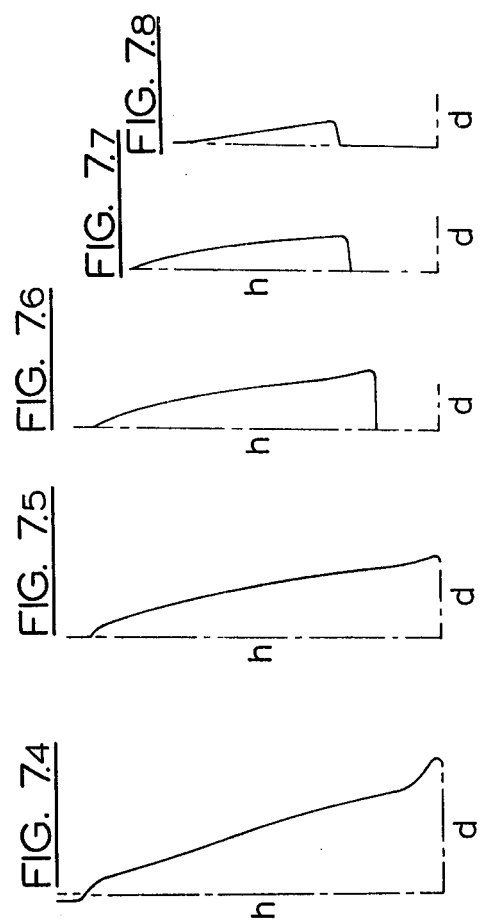

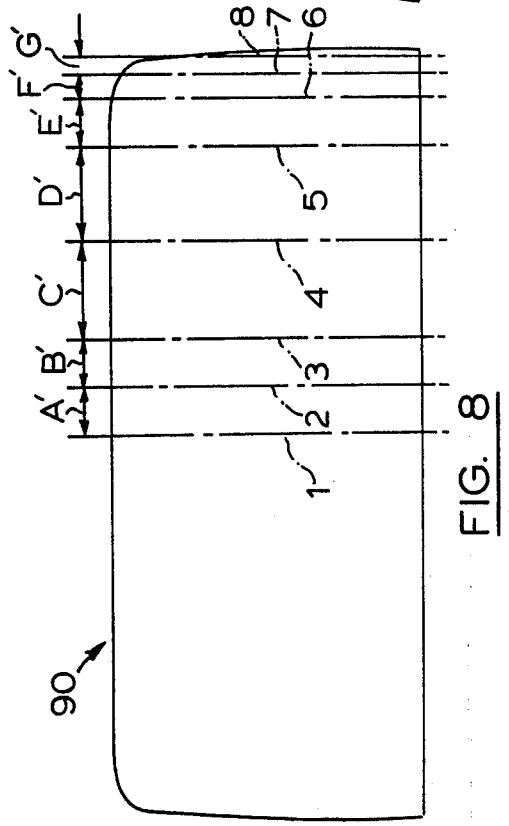
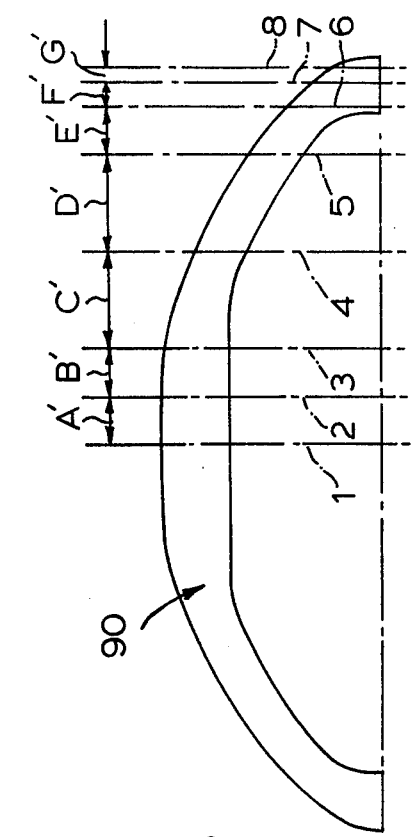
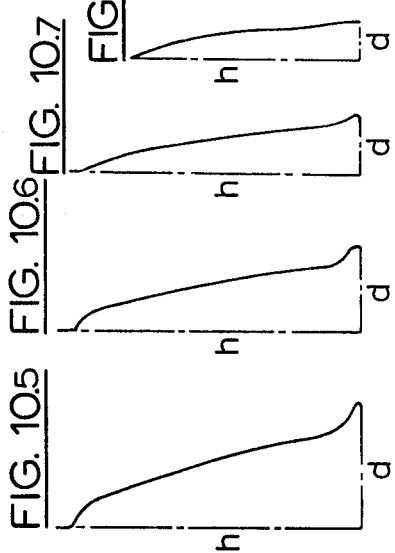

AIR DEFLECTOR

This invention relates generally to air deflectors for road vehicles.

In particular, the invention has been devised in connection with air deflectors for road transport vehicles such as tractor-trailers and fixed-body trucks.

However, it is to be understood that there is no limitation in this and that the invention is applicable to any road vehicle having a cab and a load-carrying body section disposed rearwardly of and extending above the cab.

Air deflector devices have previously been proposed for road vehicles of the type referred to above. An example of a prior art air deflector is shown in Canadian Pat. No. 809,545. Another example is disclosed in U.S. Pat. No. 2,863,695.

A problem with some prior art deflectors is that the air flow over the deflector produces low pressure zones immediately behind the top of the deflector. Air tends to be drawn downwardly into these low pressure zones, creating turbulence and reducing the effect of the deflector. A further problem with some types of deflectors used on tractor-trailers is that a particular deflector may be effective only so long as the tractor to which it is fitted hauls a particular trailer. Each time a new trailer is coupled to the tractor, the deflector may have to be adjusted or even replaced by a different deflector. As a practical matter, a tractor driver would probably seldom take the trouble to do this.

An object of the present invention is to provide an improved air deflector for a road vehicle having a cab and a load-carrying body section disposed rearwardly of and extending above the cab.

According to the invention, the deflector is adapted to be mounted on the cab of the vehicle in front of the body section. The deflector defines a front air deflecting face which is disposed generally transversely with respect to the air flow impinging on said face when the vehicle is in forward motion. The air deflecting face has a bottom leading edge and defines the following regions considered in succession in the direction in which air flows over said face in use: a first region which slopes generally rearwardly and upwardly from said leading edge; an upper region which is inclined at a relatively shallow angle to the direction of said air flow impinging on said air deflecting face; and a spoiler region formed by a flange-like portion of said deflector which extends transversely of said face and defines an upper margin of the deflector, said flange-like portion being disposed in a generally upright position so that air flowing over said face is deflected upwardly by said spoiler region as the air leaves the deflector.

The invention will be better understood by reference to the accompanying drawings which illustrate various embodiments of the invention, and in which:

FIG. 5 is a rear elevational view of a modified version of the air deflector of the previous Figs.

FIG. 6 is an underneath plan view corresponding to FIG. 5;

FIGS. 7.1 to 7.8 are views illustrating the profile of the deflector of FIGS. 5 and 6 at eight positions spaced across its width; and, FIGS. 8, 9 and 10.1 to 10.8 are views corresponding respectively to FIGS. 5, 6 and 7.1 and 7.8 and illustrate a further embodiment of the invention.

Reference will first be made to FIGS. 1 to 4 in describing an air deflector according to one embodiment of the invention mounted on the cab of a tractor-trailer. The air deflector is generally denoted 20 and is mounted on the roof of the cab 22 of the tractor unit 24. The trailer is indicated at 26 and defines a load-carrying body section of the vehicle. The air deflector is attached to the roof of cab 22 by brackets 28 and 30 which will be more specifically described later in connection with FIG. 4.

Figure 3:
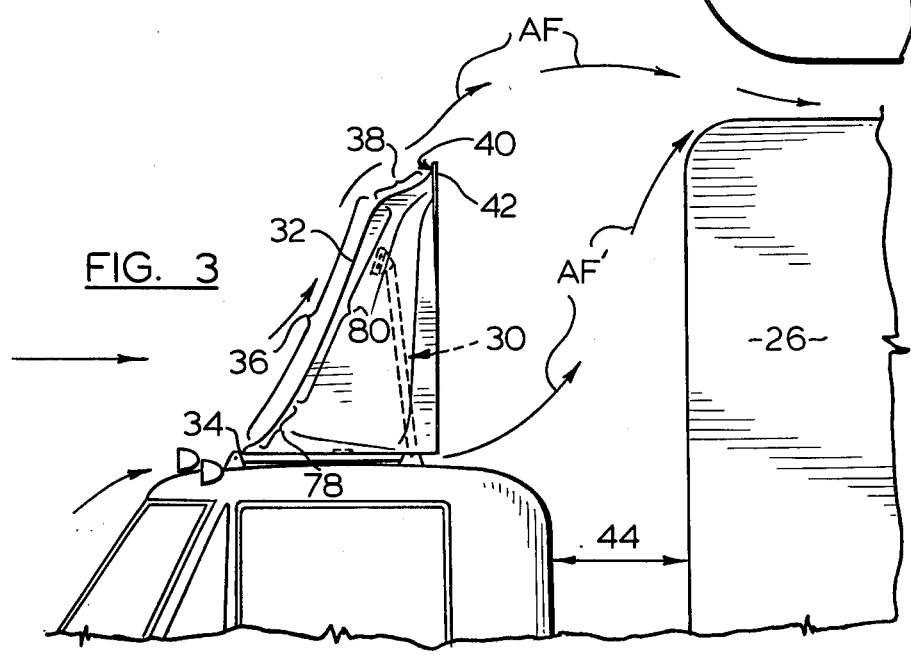

Air deflector 20 includes a front air deflecting face 32 which is disposed generally transversely with respect to the path of travel of the vehicle when the vehicle is in forward motion. The air deflecting face 32 has a bottom leading edge 34 which can be seen most prominently in FIG. 3. That view also shows the profile of the air deflecting face 32 as viewed from the side. This face may be considered as including three principal regions denoted respectively 37, 38 and 40 in FIG. 3. The first region 36 slopes generally rearwardly and upwardly from the leading edge 34 of the face. The second or upper region 38 of the face is inclined at a relatively shallow angle with respect to the horizontal (assuming that the vehicle is horizontally disposed). Region 40 is a spoiler region and is formed by a flange-like portion 42 of the deflector which extends transversely of the air deflecting face 32 and defines an upper margin of the deflector. In the embodiment illustrated, portion 42 is disposed in a vertical position so that air flowing over the face 32 is deflected vertically upwards by the spoiler region as the air leaves the deflector. In FIG. 3, the general direction of air flow over the deflector is indicated by the arrows denoted AF.

In most tractor-trailers, a fairly substantial gap exists between the rear of the cab of the tractor unit and the front of the trailer. In FIG. 3, this gap is indicated at 44. Because of this gap, a cab-mounted air deflector is necessarily disposed at a spacing forwardly of the front end of the trailer, with the result that air flowing over the deflector tends to produce low pressure zones immediately behind the deflector. These zones in turn tend to draw down into the gap the air flowing over the deflector, causing turbulence and reducing the effectiveness of the deflector.

In the arrangement according to the invention, the deflector is mounted at a slight spacing above the top of the cab of the vehicle so that some air flows below the leading edge of the deflector and into the gap between the latter and the trailer. This air flow is indicated by the arrows denoted $AF^1$ in FIG. 3. This air flow has the effect of avoiding the low pressure zones behind the deflector and accordingly reducing turbulence associated with the deflector. In a typical installation, the spacing between the bottom of the deflector and the roof of the cab would be approximately 2 inches.

Figure 1:
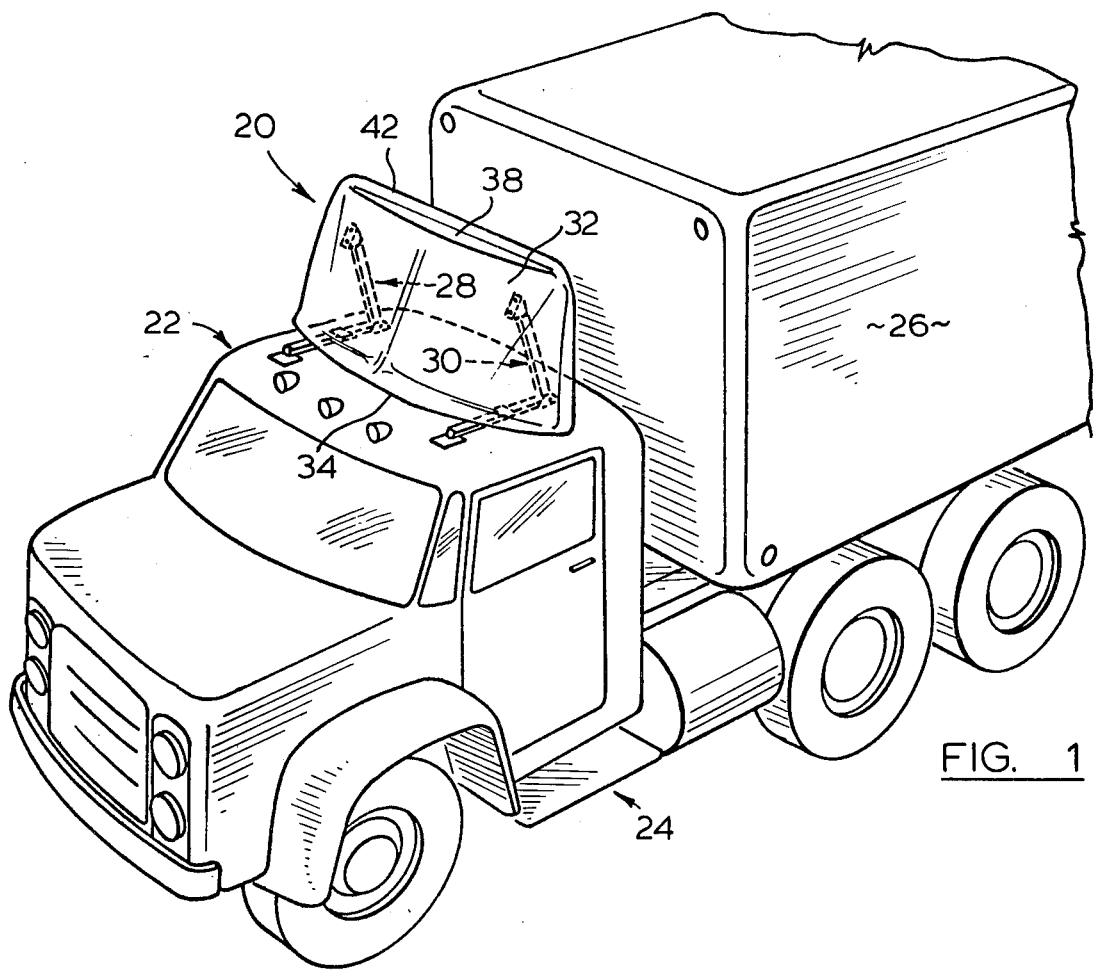
FIG. 1 is a perspective view from the front and one side of a tractor-trailer fitted with an air deflector according to one embodiment of the invention.
Figure 4:
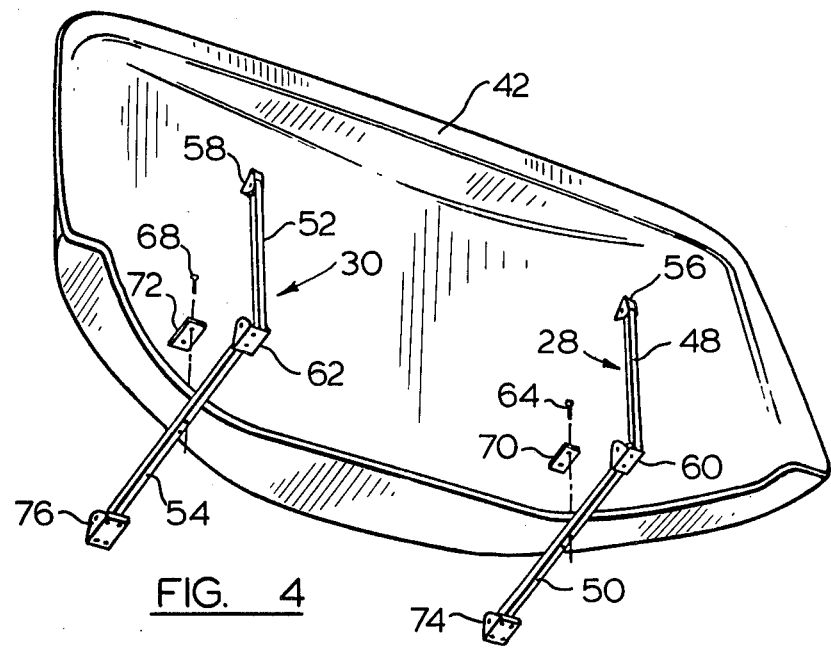
FIG. 4 is a perspective view from the rear and below of the air deflector device of the previous Figs., shown removed from the vehicle.
Figure 2:
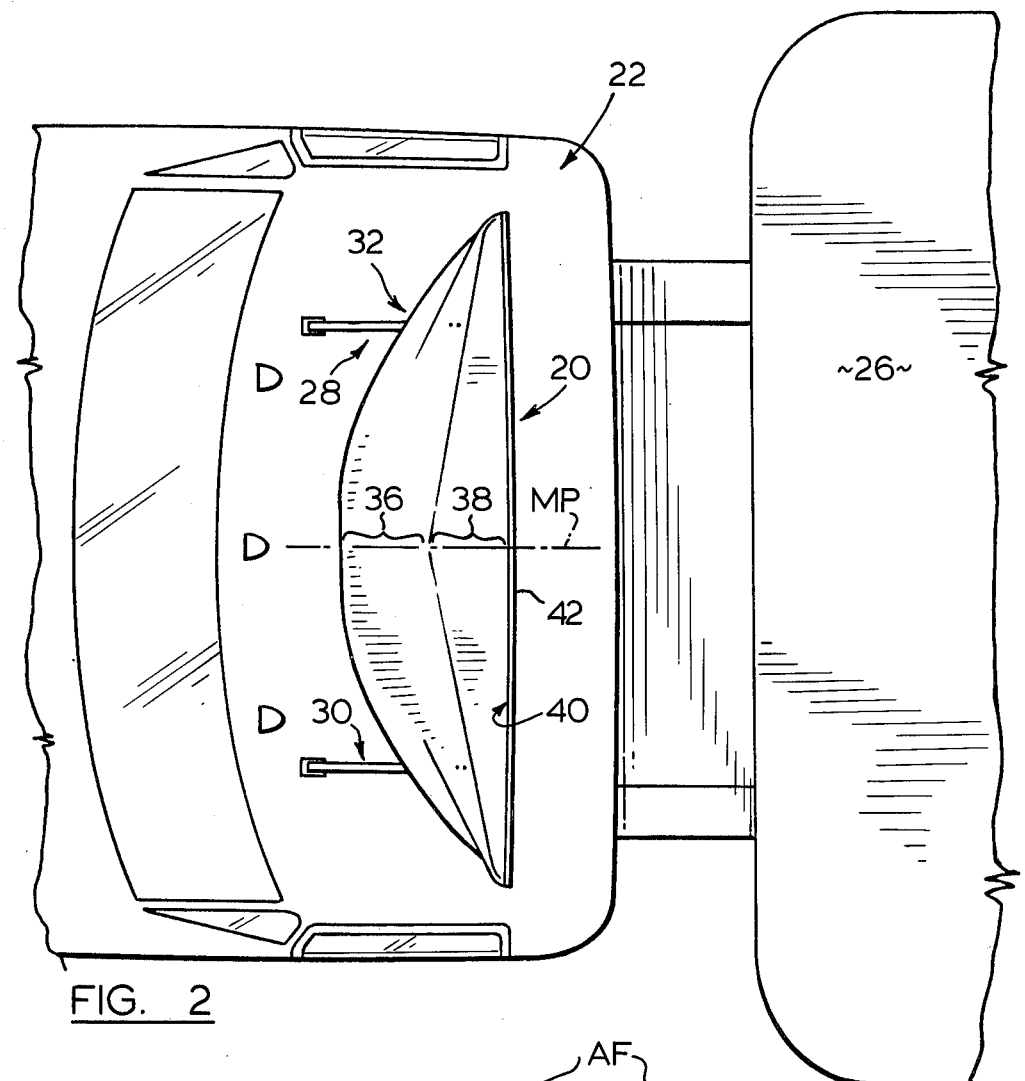
FIGS. 2 and 3 are plan and side views respectively corresponding to part of FIG. 1.

It will be seen from FIGS. 2 and 3 that the deflector 20 is of generally triangular shape both in plan view (FIG. 2) and in side view (FIG. 3). This triangular design imparts significant strength to the deflector and avoids or minimizes vibrations which tend to be set up in use. In a conventional deflector, problems often occur due to high frequency vibrations which are set up in the deflector when the vehicle to which it is fitted is in motion. These vibrations may lead to damage to the shield and/or to the mounting brackets for the deflector. The deflector according to the invention is further strengthened by the provision of an integral flange which is directed rearwardly from the leading edge 34 of the deflector. This flange is best shown in FIG. 4 and is denoted by the reference numeral 46. The deflector is in fact designed so that, when properly mounted, flange 46 is horizontal. The facilitates installation of the deflector since the installer can be confident that the deflector is in the proper position to give optimum performance when the flange 46 is level. Also, flange 46 facilitates attachment of the mounting brackets 28 and 30 (to be described).

Each of these mounting brackets includes two arms 48, 50 and 52, 54 respectively. As can be seen from FIG. 1, the arms 50 and 54 are disposed generally horizontally on top of the cab 22 in the installed position, while the arms 48 and 52 are upwardly inclined behind and support the deflector. Each of the upwardly inclined arms 48, 52 is pivotally attached at its upper end to a U-section fitment 56 or 58 respectively attached to the rear face of the shield. At its lower end, each of the arms 48, 52 is pivotally coupled to one end of the relevant horizontal arm 50 and 54 between the limbs of a second U-shaped fitment 60, 62. These fitments are bolted to the roof of the cab 22. Each of the horizontal arms 50, 54 extends forwardly from the relevant fitments 60 or 62 below the flanges 46 of the deflector and is attached to that flange by bolts 64, 68 which pass through the flange and are screwed into the relevant arm. Reinforcing plates 70, 72 are provided behind the bolt heads. At their forward ends, the horizontal arms 50 and 54 are pivotally coupled to further respective U-shaped fitments 74, 76 also bolted to the roof of the cab 22.

It will be appreciated that the fitments 28 and 30 make for ease of mounting of the deflector on the cab of the vehicle in question. It is simply necessary to drill appropriately positioned holes through the roof of the cab and attach the fitments 62, 62 and 74, 76 by suitable bolts. The positions of the bolts 64 and 68 which pass through the bottom flange 46 of the deflector can be adjusted to bring the flange to a horizontal position, thereby ensuring that the deflector as a whole is correctly angled (see above). Also, the horizontal arms 50 and 54 ensure that the deflector is appropriately spaced from the roof of the cab to provide the required air flow AF¹ below the deflector as described above.

The preceding description explains the operation of the deflector in general terms. A more specific description will now follow with reference to particular forms of deflector used in practice.

By way of example, the deflector shown in FIGS. 1 to 4 is of approximately 70 inches in width, 39 inches in height and 24 inches in depth at the base. The bottom flange 46 is 6 inches wide. It will be appreciated that FIG. 3 is illustrative of the profile of the air deflecting face 32 as viewed on a longitudinal median plane of the deflector. This plane is indicated at MP in FIG. 2; the deflector is symmetrical about this plane. In the illustrated embodiment, the first region 36 of face 32 can be considered as including a lower guiding region 78 immediately adjacent the leading edge 34. The inclination of this region to the horizontal, considered on the median plane MP is approximately 55°. This lower guiding region guides and scoops up air at the bottom of the deflector. The remainder of region 36 (denoted 80 in FIG. 3) is inclined at approximately 75° to the horizontal when considered on the median plane MP. This section deflects upwardly air from the lower section 78 as well as air which impinges directly on that section.

Region 38 acts as a "lead-in" to the spoiler region 40. This portion of the face is inclined at a very shallow angle to the horizontal and would typically be between 5 to 10 inches in front to rear extent at its maximum. Finally, the spoiler region 40 is vertically disposed and is typically of between 2 and 4 inches in height.

It will be appreciated from the plan view of FIG. 2 that the profile of the air deflecting face 32 merges smoothly from the profile shown in FIG. 3 in the central area of the median plane MP to the side of the deflector at which the face meets a transverse vertical plane containing the flange-like portion 42. Accordingly, the profile of the face 32 becomes progressively steeper in passing from the centre area of the deflector to its sides. This change in profile will be more specifically explained below in connection with FIGS. 5, 6 and 7.1 and 7.8.

FIGS. 5 and 6 show respectively a rear elevational profile and a plan view of a deflector 80 which is a slightly modified version of the deflector 20 described above. The deflector of FIGS. 5 and 6 differs from deflector 20 in that its bottom corners are cut away as indicated at 82 and 84 to reduce the width of the base to approximately 60 inches. This allows the deflector to be used on trucks having a cab width of 65 inches and below. For widths of over 65 inches, deflector 20 without the cut-outs 82 and 84 may be used. The chain dotted lines 86, 88 in FIG. 5 indicate the profiles of the bottom corners for this particular deflector.

In FIGS. 5 and 6, the chain dotted lines denoted 1 to 8 represent vertical longitudinal section lines through the deflector. Section line 1 is taken on the longitudinal median plane of the deflector and the deflector is symmetrical about that line. The section lines are spaced transversely of the deflector and the spacings between the lines are denoted by the letters A to G. FIGS. 7.1 to 7.8 illustrate the profiles of the air deflecting face 32 of the deflector at section lines 1 to 8 respectively. Each of FIGS. 7.1 to 7.8 may be considered as a graph representing the profile of the relevant part of the deflector in which the abscissa of the graph represents the depth d of the deflector and the ordinate represents the height h of the deflector in the plane at which the particular section is taken. On this basis, the profile of the air deflecting face 32 may be represented by a series of co-ordinates on the respective axes of the graph. Table 1 below contains a series of such co-ordinates expressed in terms of the depth (d) and height (h) of the deflector for each of the section lines 1 to 8.

FIGS. 8, 9 and 10.1 to 10.8 correspond respectively to FIGS. 5, 6 and 7.1 to 7.8 and show a deflector 90 according to a further embodiment of the invention. Table 2 below corresponds to Table 1 and contains co-ordinates defining the shape of the air deflecting faces of deflector 90 on section lines 1 to 8 in FIGS. 8 and 9. Deflector 90 is of approximately 80 inches in width, 33 inches in height and 24 inches in depth. This deflector is designed primarily (but not exclusively) for use on so-called "cab-over" trucks in which the cab is positioned above the engine, while the deflectors described previously are designed primarily (but not exclusively) for conventional trucks in which the engine compartment projects forwardly of the cab.

TABLE 1

| d | 1 h | A | 2 d | 2 h | B | 3 d | 3 h | C | 4 d | 4 h | D | 5 d | 5 h | E | 6 d | 6 h | F | 7 d | 7 h | G | 8 d | 8 h |
|---|---|---|---|---|---|---|---|---|---|---|---|---|---|---|---|---|---|---|---|---|---|---|
| 1/4 | 19 | 1/2 | 1/4 | 39 | 3/4 | 1/2 | 39 | 1 | 13/16 | 39 | 1/2 | 38 1/2 | | 1/2 | 37 3/4 | | | | | | |
| 1/2 | 18 | | 18 | | | 18 | | | 38 | | | | | | | | | | | | | |
| 1 | 17 1/2 | | 7/8 | 17 1/2 | | 7/8 | 37 1/2 | | 1 1/8 | 37 1/2 | | 1 1/8 | 38 | | 1 1/2 | 35 1/2 | | | | | | |
| 2 9/16 | 17 | | 2 3/16 | 17 | | 1 1/2 | 37 | | 1 3/8 | 37 | | 1 3/8 | 37 1/2 | | 1 7/8 | 35 | | | | | | |
| 3 1/4 | 16 1/4 | | 3 | 36 3/4 | | 2 1/16 | 16 3/4 | | 1 3/4 | 36 3/4 | | 1 1/2 | 37 | | 2 3/8 | 34 | | | | | | |
| 5 1/8 | 15 | | 5 | 35 | | 4 1/2 | 35 | | 3 3/8 | 35 | | 36 3/4 | | | 33 | | | | | | | |
| 7 | 12 1/2 | | 15/16 | 32 1/2 | | 5 5/8 | 32 1/2 | | 4 1/4 | 32 1/2 | | 2 5/8 | 35 | 5/8 | 2 7/8 | 32 1/2 | | 1 1/2 | 32 | | | |
| 11/16 | | | 7 1/4 | | | | | | | | | | | | | | | | | | | |
| 8 5/8 | 10 | | 4 1/8 | 30 | | 6 1/2 | 30 | | 5 | 30 | | 3 1/2 | 32 1/2 | 3 7/16 | 30 | | 2 1/16 | 30 | | | | |
| 9 5/16 | 29 1/2 | | 8 7/8 | 27 1/2 | | 7 1/4 | 27 1/2 | | 5 5/8 | 27 1/2 | | 4 1/8 | 30 | | 4 1/8 | 27 1/2 | | 2 5/8 | 27 1/2 | | | |
| 10 3/16 | 25 | | 9 5/8 | 25 | | 8 1/8 | 25 | | 6 7/16 | 25 | | 4 3/4 | 27 1/2 | | 4 1/2 | 25 | | 3 1/4 | 25 | | | |
| 11 1/4 | 22 1/2 | | 10 1/2 | 22 1/2 | | 9 | 22 1/2 | | 7 1/4 | 22 1/2 | | 5 3/8 | 25 | | 5 | 22 1/2 | | 3 5/8 | 22 1/2 | | | |
| 12 1/8 | 20 | | 11 5/8 | 20 | | 10 1/8 | 20 | | 8 1/8 | 20 | | 6 | 22 1/2 | | 5 3/8 | 20 | | 3 7/8 | 20 | | | |
| 11 1/2 | 17 1/2 | | 12 7/8 | 17 1/2 | | 11 3/8 | 17 1/2 | | 9 | 17 1/2 | | 6 1/2 | 20 | | 6 1/4 | 17 1/2 | | 4 3/8 | 17 1/2 | | | |
| 15 | 15 | | 14 1/4 | 15 | | 12 3/8 | 15 | | 9 3/4 | 15 | | 6 7/8 | 17 1/2 | | 6 1/2 | | | 4 1/2 | 15 | | | |
| 16 3/8 | 12 1/2 | | 19 3/4 | 12 1/2 | | 13 1/2 | 12 1/2 | | 10 1/2 | 12 1/2 | | 7 3/8 | 15 | 6 1/2 | 12 1/2 | | | 12 1/2 | | | | |
| 19 1/8 | 10 | | 17 3/8 | 10 | | 14 5/8 | 10 | | 11 1/8 | 10 | | 7 7/8 | 12 1/2 | | 6 7/8 | 10 | | 5 | 10 | | | |
| 19 3/4 | 7 1/2 | | 18 7/8 | 7 1/2 | | 15 3/4 | 7 1/2 | | 11 3/4 | 7 1/2 | | 8 | 10 | | 7 1/2 | 7 1/2 | | 4 5/8 | 9 1/2 | | | |
| 21 9/16 | 5 | | 20 3/8 | 5 | | 17 | 5 | | 12 1/8 | 5 | | 8 1/2 | 7 1/2 | 7 1/8 | 6 1/2 | | 1/2 | 9 | | | | |
| 22 3/8 | 4 | 22 3/4 | 21 1/2 | 4 | 3 | 17 3/8 | 4 | 3 | 12 1/4 | 4 | | 8 3/4 | 5 | | | 5 | | 1/2 | 5 | | | |
| 23 3/8 | 3 | | 3 | 18 1/2 | | 12 7/8 | | | 7 7/8 | | 4 | | 1 1/2 | | 4 | | | 3 3/8 | 3 3/8 | 15 | | |
| 22 1/16 | 2 | | 24 1/2 | 2 | | 20 3/8 | 2 | | 14 1/4 | 2 | | 9 1/4 | 3 | | 1 1/2 | 3 | | 1 1/2 | 3 | | 3 5/9 | 11 |
| 25 9/16 | | | 25 1/8 | | | 21 | | | 16 3/8 | | | 10 | | | | | | | | | 3 1/2 | 10 |

TABLE 2

| | 1 | | A¹ | 2 | | B¹ | 3 | | C¹ | 4 | | D¹ | 5 | | E¹ | 6 | | F¹ | 7 | | G¹ | | |
|---|---|---|---|---|---|---|---|---|---|---|---|---|---|---|---|---|---|---|---|---|---|---|---|
| | d→ | h↓ | | d→ | h↓ | | d→ | h↓ | | d→ | h↓ | | d→ | h↓ | | d→ | h↓ | | d→ | h↓ | | d→ | h↓ |
| | 0 | 33 | | 0 | 33 | | 0 | 33 | | 0 | 33 | | | | | | | | | | | | |
| | 0 | 32 | | 7/8 | 32 | | 0 | 32 | | 0 | 32 | | | | | | | | | | | | |
| | 3/4 | 31 1/2 | | 2 | 31 1/2 | | 7/8 | 31 1/2 | | 9/16 | 31 1/2 | | | 33 | | | 32 1/2 | | | 31 3/4 | | | 0 | |
| | 3 | 31 | | 15/16 | 31 | | 2 7/16 | 31 | | 15/16 | 31 | | 0 | 32 | | | 31 1/2 | | | 29 7/8 | | | 9/16 | |
| | 4 3/8 | 30 1/2 | | 4 3/8 | 30 1/2 | | 3 3/4 | 30 1/2 | | 2 3/8 | 30 1/2 | | 3/8 | 31 | | 31 | 30 1/2 | | 29 | 1 3/4 | | | 20 | |
| | 5 7/16 | 30 | | 5 3/16 | 30 | | 4 11/16 | 30 | | 3 3/16 | 30 | | 1/2 | 31 | | 1/2 | 30 | | 1 3/8 | 28 | | 2 1/2 | 17 1/2 |
| | 6 3/8 | 29 | | 6 3/16 | 29 | | 5 3/4 | 29 | | 4 1/8 | 29 | | 7/8 | 30 1/2 | | 1 1/8 | 29 | | 1 7/8 | 27 | | 2 3/4 | 15 |
| | 6 7/8 | 28 | | 6 3/4 | 28 | | 6 5/16 | 28 | | 4 5/8 | 28 | | 1 1/2 | 30 | | 1 7/9 | 28 | | 2 7/16 | 25 | | 3 | 12 1/2 |
| | 7 7/16 | 27 | | 7 1/4 | 27 | | 6 3/4 | 27 | | 5 1/6 | 27 | | 2 1/8 | 29 | | 2 3/16 | 27 | | 2 7/8 | 22 1/2 | | 3 3/16 | 10 |
| | 8 5/16 | 25 | | 8 | 25 | | 7 1/2 | 25 | | 5 3/4 | 25 | | 2 3/4 | 28 | | 2 1/2 | 25 | | 3 7/16 | 20 | | 3 3/8 | 7 1/2 |
| | 10 3/8 | 20 | | 10 1/8 | 20 | | 9 1/2 | 20 | | 7 13/16 | 20 | | 3 1/8 | 27 | | 3 1/8 | 20 | | 2 7/8 | 17 1/2 | | 3 1/2 | 5 |
| | 11 1/2 | 17 1/2 | | 12 7/16 | 15 | | 11 3/4 | 15 | | 8 7/8 | 17 1/2 | | 3 1/2 | 25 | | 4 3/8 | 17 1/2 | | 3 7/8 | 15 | | 3 3/4 | 4 |
| | 12 11/16 | 15 | | 13 3/4 | 12 1/2 | | 12 5/8 | 12 1/2 | | 10 3/16 | 15 | | 4 1/8 | 20 | | 5 1/2 | 15 | | 4 1/8 | 12 1/2 | | 3 7/8 | 3 |
| | 14 | 12 1/2 | | 15 1/4 | 10 | | 14 7/16 | 10 | | 10 3/16 | 10 | | 5 7/8 | 17 1/2 | | 5 3/4 | 12 1/2 | | 4 7/16 | 10 | | 4 | 2 |
| | 16 1/2 | 10 | | 16 3/4 | 7 1/2 | | 16 3/16 | 7 1/2 | | 13 1/4 | 7 1/2 | | 6 7/8 | 15 | | 6 3/8 | 10 | | 4 3/4 | 7 1/2 | | | |
| | 17 5/8 | 7 | | 18 3/8 | 5 | | 17 7/16 | 5 | | 14 5/8 | 5 | | 7 3/4 | 12 1/2 | | 5 3/4 | 7 1/2 | | 4 7/8 | 5 | | | |
| | 18 7/8 | 5 | | 19 3/16 | 4 | | 18 3/8 | 4 | | 14 5/8 | 4 | | 8 1/2 | 10 | | 6 3/8 | 5 | | 5 1/8 | 4 | | | |
| | 19 5/8 | 4 | | 19 7/8 | 3 | | 18 3/4 | 3 | | 15 5/16 | 3 | | 9 1/8 | 7 1/2 | | 6 7/8 | 4 | | 5 1/4 | 3 | | | |
| | 20 3/8 | 3 | | 20 7/8 | 2 | | 19 11/16 | 2 | | 16 3/8 | 2 | | 9 7/16 | 5 | | 7 1/4 | 3 | | 5 3/4 | 2 | | | |
| | 21 | 2 | | 22 | 1 | | 21 1/16 | 1 | | 16 15/16 | 1 1/2 | | 9 3/4 | 4 | | 7 7/8 | 2 1/2 | | 6 1/4 | 1 | | | |
| | 22 1/8 | 1 | | 23 | | | 22 7/16 | | | 19 3/4 | | | 10 3/8 | 3 | | 8 | 2 | | 6 1/4 | | | | |
| | 23 1/4 | 0 | | | | | | | | | | | 10 11/16 | 2 | | 9 1/4 | 1 | | | | | | |
| | | | | | | | | | | | | | 13 1/4 | 1 | | | | | | | | | |

In Table 1 and Table 2 the figures represent distances in inches. The letters A to G in Table 1 represent the spacings between the respective section lines 1 to 8 in FIGS. 5 and 6. Similarly the letters $A^1$ to $G^1$ in Table 2 represent the corresponding spacings for FIGS. 8 and 9. The distances denoted by these letters are as follows:

|         | A    | B     | C     | D     | E    | F     | G     |
|---------|------|-------|-------|-------|------|-------|-------|
| Table 1 | 5″   | 10″   | 10″   | 5″    | 2″   | 2″    | ⅞″    |
|         | $A^1$ | $B^1$ | $C^1$ | $D^1$ | $E^1$ | $F^1$ | $G^1$ |
| Table 2 | 5″   | 5″    | 10″   | 10″   | 5″   | 2¼″   | 1⅝″   |

Although there is no limitation in this, air deflectors according to the invention are preferably manufactured as glass fibre mouldings. The mouldings are produced by a spraying technique in which chopped glass fibres are sprayed with resin onto a form. Preferably the fibres are of between 1½ and 2 inches in length. The glass fibres are preferably sprayed onto the form from three directions: firstly, directly onto the form and subsequently from each side. This results in a sandwich construction in which the fibres are oriented in three different directions. This method is adopted for optimum strength. Conventional glass fibre moulding techniques are employed to produce a smooth surface finish on the deflector since it is desirable that the air deflecting face should be as smooth as possible in order to minimize turbulence. Also, bolts for the mounting brackets of the deflector can be moulded into the structure, again using convential glass fibre moulding techniques.

It should finally be noted the the preceding description applies to specific embodiments of the invention only and that numerous modications are possible. For example, the deflector could be made of other than of a glass fibre moulding. Also, it would of course be possible to make deflectors in sizes other than those specifically mentioned above. In this connection, it is to be understood that the specific dimensions quoted above are representative of particular embodiments of the invention and are not to be considered as exclusive. Referring to the particular angular inclinations of the regions of the deflecting face 32 of the deflector discussed in connection with FIG. 3, it is believed that these figures may represent approximately optimum values but that the deflector would be effective using other inclinations. A variation of approximately 10° in each figure quoted is thought to be possible.

What I claim as my invention is:

1. An air deflector for use with a road vehicle of the kind which is adapted for travel forwardly along a path of travel and which has a cab and a load-carrying body section disposed rearwardly of and extending above said cab, said deflector having a streamlined air deflecting face and being adapted to be mounted on said cab in front of said body portion with said air deflecting face facing generally forwardly and with said face disposed generally transversely of said path of travel, said face having the following features, which are defined with reference to an orientation of said face forwardly and disposed generally across said path of travel and oriented for movement along a horizontal said path of travel:
    (a) a bottom leading edge,
    (b) a first region extending from said bottom leading edge and sloping generally rearwardly and upwardly therefrom, said first region having an upper section sloping upwardly and rearwardly at a relatively steep angle to the horizontal,
    (c) a second region extending from the upper margin of said upper section and sloping upwardly and rearwardly therefrom at a relatively shallow angle to the horizontal,
    (d) a third spoiler region formed by a flange-like portion of said deflector, said spoiler region extending from the upper margin of said second region and forming an upper margin of said deflector, said spoiler region being disposed in a generally upright position so that air flowing over said face is deflected upwardly by said spoiler region as the air leaves the deflector.

2. An air deflector as claimed in claim 1, which is symmetrical about a longitudinal median plane of the deflector, wherein said regions of the air deflecting face extend across a central portion of the deflector and merge laterally of said median plane and rearwardly of said face into a transverse vertical plane containing said spoiler region of the deflector, said deflector being of generally triangular shape in side view and plan view, and said deflector further comprising an integral flange extending rearwardly of said air deflecting face from said bottom leading edge, said flange being oriented in a horizontal plane.

3. An air deflector as claimed in claim 1, which is symmetrical about a longitudinal median plane of the deflector, wherein said regions of the air deflecting face extend across a central portion of the deflector and merge laterally of said median plane and rearwardly of the deflector into a transverse vertical plane containing said spoiler region of the deflector.

4. A deflector as claimed in claim 1, further comprising a pair of mounting brackets for attaching the deflector to the cab of a road vehicle, said brackets each comprising first and second limbs pivotally coupled to one another and each coupled to the deflector, a first one of said limbs being disposed in a generally upright position rearwardly of the deflector, and a second one of said limbs extending forwardly from said first limb below said leading edge of the deflector so as to space the deflector slightly above the cab of the road vehicle in use, said brackets each being adapted to be coupled to the roof of the road vehicle.

5. An air deflector as claimed in claim 1, which is symmetrical about a longitudinal median plane of the deflector and is of a shape represented by the co-ordinates in the following table, denoted Table 1, in which:
    the eight columns denoted 1 to 8 represent the profile of the air deflecting face as viewed on eight longitudinal planes spaced transversely of the face from said median plane, column 1 representing the profile of the face on said median plane;
    the letters $d$ and $h$ in the heading of each column represent the depth and height respectively of points on the air deflecting face at the position of the relevant longitudinal plane as measured from a datum base plane containing said leading edge of the air deflecting face, and a rear datum plane normal to said base plane;
    the letters A to G represent the spacings between the planes denoted 1 to 8 and have the following values:

| A | B  | C  | D | E | F | G |
|---|----|----|---|---|---|---|
| 5 | 10 | 10 | 5 | 2 | 2 | ⅞ | the figures both in Table 1 and above represent distances in inches:

TABLE 1

| d | 1 h | A d | 2 h | B | 3 d | 3 h | C | 4 d | 4 h | D | 5 d | 5 h | E | 6 d | 6 h | F | 7 d | 7 h | G | 8 d | 8 h |
|---|---|---|---|---|---|---|---|---|---|---|---|---|---|---|---|---|---|---|---|---|---|
| 1/4 | 19 | | | | | | | | | | | | | | | | | | | | |
| 1/2 | 18 | 1/2 | 39 | 3/4 | 1/2 | 39 | 1 | 13/16 38 | 39 | 1/2 | 38 1/2 | 38 | 1/2 37 3/4 | | | | | | | | |
| 1 | 17 1/2 | 18 | 17 1/2 | | 7/8 | 37 1/2 | | 1 1/8 | 37 1/2 | | 1 1/2 | 38 | 1 1/2 | 1 1/2 | 35 1/2 | | | | | | |
| 2 9/16 | 17 | 7/8 | 17 | | 1 1/2 | 37 | | 1 3/8 | 37 | | 1 1/2 | 37 1/2 | 1 7/8 | 35 | | | | | | | |
| 3 1/4 | 16 1/4 | 2 3/16 | 36 3/4 | | 2 1/16 | 36 3/4 | | 1 3/4 | 36 3/4 | | 1 1/2 | 37 | 2 3/8 | 34 | | | | | | | |
| 5 1/8 | 15 | 3 | 35 | | 4 1/2 | 35 | | 3 3/8 | 35 | 1 1/2 | 36 3/4 | | 2 5/8 33 | | | | | | | | |
| | | 5 15/16 | | | | | | | | | | | | | | | | | | | |
| 7 11/16 | 12 1/2 | 7 1/4 | 32 1/2 | | 5 5/8 | 32 1/2 | | 4 1/4 | 32 1/2 | | 2 5/8 | 35 | | 2 7/8 | 32 1/2 | 1 1/2 | 32 | | | | |
| 8 5/8 | 10 | 4 1/8 | 30 | | 6 1/2 | 30 | | 5 | 30 | | 3 1/2 | 32 1/2 | 3 7/16 | 30 | | 2 1/16 | 30 | | | | |
| 9 5/16 | 29 1/2 | 8 7/8 | 27 1/2 | | 7 1/4 | 27 1/2 | | 5 5/8 | 27 1/2 | | 4 1/8 | 30 | | 4 1/8 | 27 1/2 | | 2 5/8 | 27 1/2 | | | |
| 10 3/4 | 25 | 9 5/8 | 25 | | 8 1/8 | 25 | | 6 7/16 | 25 | | 4 3/4 | 27 1/2 | | 4 1/2 | 25 | | 3 1/4 | 25 | | | |
| 11 1/4 | 22 1/2 | 10 1/2 | 22 1/2 | | 9 | 22 1/2 | | 7 1/4 | 22 1/2 | | 5 3/8 | 25 | | 5 | 22 1/2 | | 3 5/8 | 22 1/2 | | | |
| 12 1/8 | 20 | 11 5/8 | 20 | | 10 1/8 | 20 | | 8 1/8 | 20 | | 6 | 22 1/2 | | 5 3/8 | 20 | | 3 7/8 | 20 | | | |
| 11 1/2 | 17 1/2 | 12 7/8 | 17 1/2 | | 11 3/8 | 17 1/2 | | 9 | 17 1/2 | | 6 1/2 | 20 | | 5 7/8 | 17 1/2 | | 4 3/8 | 17 1/2 | | | |
| 15 | 15 | 14 1/4 | 15 | | 12 3/8 | 15 | | 9 3/4 | 15 | | 6 7/8 | 17 1/2 | | 6 1/4 | 15 | | 4 1/2 | 15 | | | |
| 16 3/8 | 12 1/2 | 19 3/4 | 12 1/2 | | 13 1/2 | 12 1/2 | | 10 1/2 | 12 1/2 | | 7 3/8 | 15 | 6 1/2 | 12 1/2 | | 4 5/8 | 12 1/2 | | | | |
| 19 1/8 | 10 | 17 3/8 | 10 | | 14 5/8 | 10 | | 11 1/8 | 10 | | 7 7/8 | 12 1/2 | | 6 7/8 | 10 | | 5 | 10 | | | |
| 19 3/4 | 7 1/2 | 18 7/8 | 7 1/2 | | 15 3/4 | 7 1/2 | | 11 3/4 | 7 1/2 | | 8 | 10 | | 7 1/2 | 7 1/2 | | 4 5/8 | 9 1/2 | | | |
| 21 9/16 | 5 | 20 3/8 | 5 | | 17 | 5 | | 12 1/8 | 5 | 8 1/2 | 7 1/2 | 7 1/8 | | | 1/2 9 | | | | | | |
| 22 3/8 | 4 | 21 1/2 | 4 | | 17 3/8 | 4 | | 12 1/4 | 4 | 4 | 8 3/4 | 5 1/2 | 4 | | 5 1 1/2 | | 5 3 3/8 | 5 15 | | | |
| 23 3/8 | 3 | 22 3/4 3 | 18 1/2 | 3 | | 4 7/8 | 3 | | 7 7/8 | | 1 1/2 | 3 | | 3 3/8 | 15 | | | | | | |
| 22 1/16 | 2 | 24 1/2 | 2 | | 20 3/8 | 2 | | 14 1/4 | 2 | | 9 1/4 | 3 | | 1 1/2 | 3 | | 1 1/2 | 3 | 3 5/9 | 11 3 1/2 | 10 |
| 25 9/16 | | 25 1/8 | | | 21 | | | 16 3/8 | | | 10 | | | | | | | | | | |

6. An air deflector as claimed in claim 1, which is symmetrical about a longitudinal median plane of the deflector and is of a shape represented by the co-ordinates in the following table, denoted Table 2, in which:

- the eight columns denoted 1 to 8 represent the profile of the air delfecting face as viewed on eight longitudinal planes spaced transversely of the face from said median plane, column 1 representing the profile of the face on said median plane;
- the letters $d$ and $h$ in the heading of each column represent the depth and height respectively of points on the air deflecting face at the position of the relevant longitudinal plane as measured from a datum base plane containing said leading edge of the air deflecting face, and a rear datum plane normal to said base plane;
- the letters $A^1$ to $G^1$ represent the spacings between the planes denoted 1 to 8 and have the following values:

| $A^1$ | $B^1$ | $C^1$ | $D^1$ | $E^1$ | $F^1$ | $G^1$ |
|---|---|---|---|---|---|---|
| 5 | 5 | 10 | 10 | 5 | 2½ | 1⅝ | the figures both in Table 2 and above represent distances in inches:

TABLE 2

| d | 1 h | A¹ | 2 d | 2 h | B¹ | 3 d | 3 h | C¹ | 4 d | 4 h | D¹ | 5 d | 5 h | E¹ | 6 d | 6 h | F¹ | 7 d | 7 h | G¹ | d | h |
|---|---|---|---|---|---|---|---|---|---|---|---|---|---|---|---|---|---|---|---|---|---|---|
| 0 | 33 | | | | | | | | | | | | | | | | | | | | | |
| 0 | 32 | | | 33 | | | | | | | | | | | | | | | | | | |
| 0 | 31½ | | 7/8 | 32 | | 0 | 33 | | 0 | 33 | | | | | | | | | | | | |
| 0 | 31 | | 2 | 31½ | | 0 | 32 | | 0 | 32 | | | | | | | | | | | | |
| 3 | | | 15/16 | 31 | | 7/8 | 31½ | | 9/16 | 31½ | | | 33 | | | 32½ | | | 31¾ | | 0 | |
| 4 3/8 | 30½ | | 4 3/8 | 30½ | | 2 7/16 | 31 | | 1 5/16 | 31 | | 0 | 32 | | | 31½ | | 0 | 29¾ | | 9/16 | |
| | | | | | | 3 3/4 | 30½ | | 2 3/8 | 30½ | | 3/8 | 31 | | 31 | 30½ | | 29 | 28 | | 20 | |
| 5 7/16 | 30 | | 5 3/16 | 30 | | 4 11/16 | 30 | | 3 3/16 | 30 | | ½ | 30½ | | ½ | 30 | | 1 3/8 | 27 | | 2½ | 17½ |
| 6 3/8 | 29 | | 6 3/16 | 29 | | 5 3/4 | 29 | | 4 1/8 | 29 | | 7/8 | 31 | | 1 1/8 | 30 | | 1 7/8 | 25 | | 2¾ | 15 |
| 6 7/8 | 28 | | 6 3/4 | 28 | | 6 5/16 | 28 | | 4 5/8 | 28 | | 1½ | 30 | | 1 7/9 | 29 | | 2 7/16 | 22½ | | 3 | 12½ |
| 7 7/16 | 27 | | 7 1/4 | 27 | | 6 3/4 | 27 | | 5 1/6 | 27 | | 2 1/8 | 29 | | 2 3/16 | 28 | | 2 7/8 | 20 | | 3 3/16 | 10 |
| 8 5/16 | 25 | | 8 | 25 | | 7 1/2 | 25 | | 5 3/4 | 25 | | 2 3/4 | 28 | | 2½ | 27 | | 3 7/16 | 17½ | | 3 3/8 | 7½ |
| 10 3/8 | 20 | | 10 1/8 | 20 | | 9 1/2 | 20 | | 7 13/16 | 20 | | 3 1/2 | 27 | | 3 1/8 | 25 | | 3 7/8 | 15 | | 3½ | 5 |
| 11½ | 17½ | | 12 7/16 | 15 | | 11 3/4 | 15 | | 8 7/8 | 17½ | | 3 1/8 | 25 | | 4 3/8 | 20 | | 4 1/8 | 12½ | | 3¾ | 4 |
| 12 11/16 | 15 | | 13 3/4 | 12½ | | 12 5/8 | 12½ | | 10 3/16 | 15 | | 4 1/8 | 20 | | 5 | 15 | | 4 7/16 | 10 | | 3 7/8 | 3 |
| 14 | 12½ | | 15 1/4 | 10 | | 14 7/16 | 10 | | 12 3/16 | 12½ | | 5 7/8 | 15 | | 5½ | 12½ | | 4 3/4 | 7½ | | 4 | 2 |
| 16½ | 10 | | 16 3/4 | 7½ | | 16 3/16 | 7½ | | 13 1/4 | 10 | | 6 7/8 | 12½ | | 5 3/4 | 10 | | 4 7/8 | 5 | | | |
| 17 5/8 | 7 | | 18 3/8 | 5 | | 17 7/16 | 5 | | 14 5/8 | 7½ | | 7 3/4 | 10 | | 6 3/8 | ½ | | 5 1/8 | 4 | | | |
| 18 7/8 | 5 | | 19 3/16 | 4 | | 18 3/8 | 4 | | 15 5/16 | 5 | | 8½ | 7½ | | 6 5/8 | 4 | | 5¼ | 3 | | | |
| 19 5/8 | 4 | | 19 7/8 | 3 | | 18 3/4 | 3 | | 16 3/8 | 4 | | 9 1/8 | 5 | | 6 7/8 | 3 | | 5 3/4 | 2 | | | |
| 20 3/8 | 3 | | 20 7/8 | 2 | | 19 11/16 | 2 | | 16 15/16 | 2 | | 9 7/16 | 4 | | 7 1/4 | 2½ | | 6 1/4 | 1 | | | |
| 21 | 2 | | 22 | 1 | | 21 1/16 | 1 | | 19 3/4 | 1½ | | 9 3/4 | 3 | | 7 5/8 | 2 | | 6 1/4 | | | | |
| 22 1/8 | 1 | | 23 | | | 22 7/16 | | | | | | 10 3/8 | 2 | | 8 | 1 | | | | | | |
| 23 1/4 | 0 | | | | | | | | | | | 10 11/16 | 1 | | | | | | | | | |
| | | | | | | | | | | | | 13¼ | | | 9¼ | | | | | | | |

7. An air deflector as claimed in claim 1, wherein said first region of the air deflecting face includes a lower section having said bottom leading edge, said lower section being angled at a relatively shallow angle to the horizontal to guide and scoop up air impinging on said lower section, and said upper section being inclined upwardly at a steeper angle than said lower section.

8. An air deflector as claimed in claim 7, wherein said sections are inclined at the following angles with respect to the horizontal:

lower section: 55°
   deflecting section: 75°.

9. In combination: a road vehicle adapted for travel forwardly along a path of travel and having a cab and a load-carrying body section disposed rearwardly of and extending above the cab; and an air deflector mounted on the cab in front of the body section and spaced vertically from the top of the cab to allow air to flow below the deflector in use, the deflector having a streamlined air deflecting face which faces forwardly and is disposed generally transversely of said path of travel, said face having the following features which are defined with reference to a horizontal said path of travel:

(a) a bottom leading edge,
   (b) a first region extending from said bottom leading edge and sloping generally rearwardly and upwardly therefrom, said first region having an upper section sloping upwardly and rearwardly at a relatively steep angle to the horizontal,
   (c) a second region extending from the upper margin of said upper section and sloping upwardly and rearwardly therefrom at a relatively shallow angle to the horizontal,
   (d) a third spoiler region formed by a flange-like portion of said deflector, said spoiler region extending from the upper margin of said second region and forming an upper margin of said deflector, said spoiler region being disposed in a generally upright position so that air flowing over said face is deflected upwardly by said spoiler region as the air leaves the deflector.

* * * * *